Figure 4:
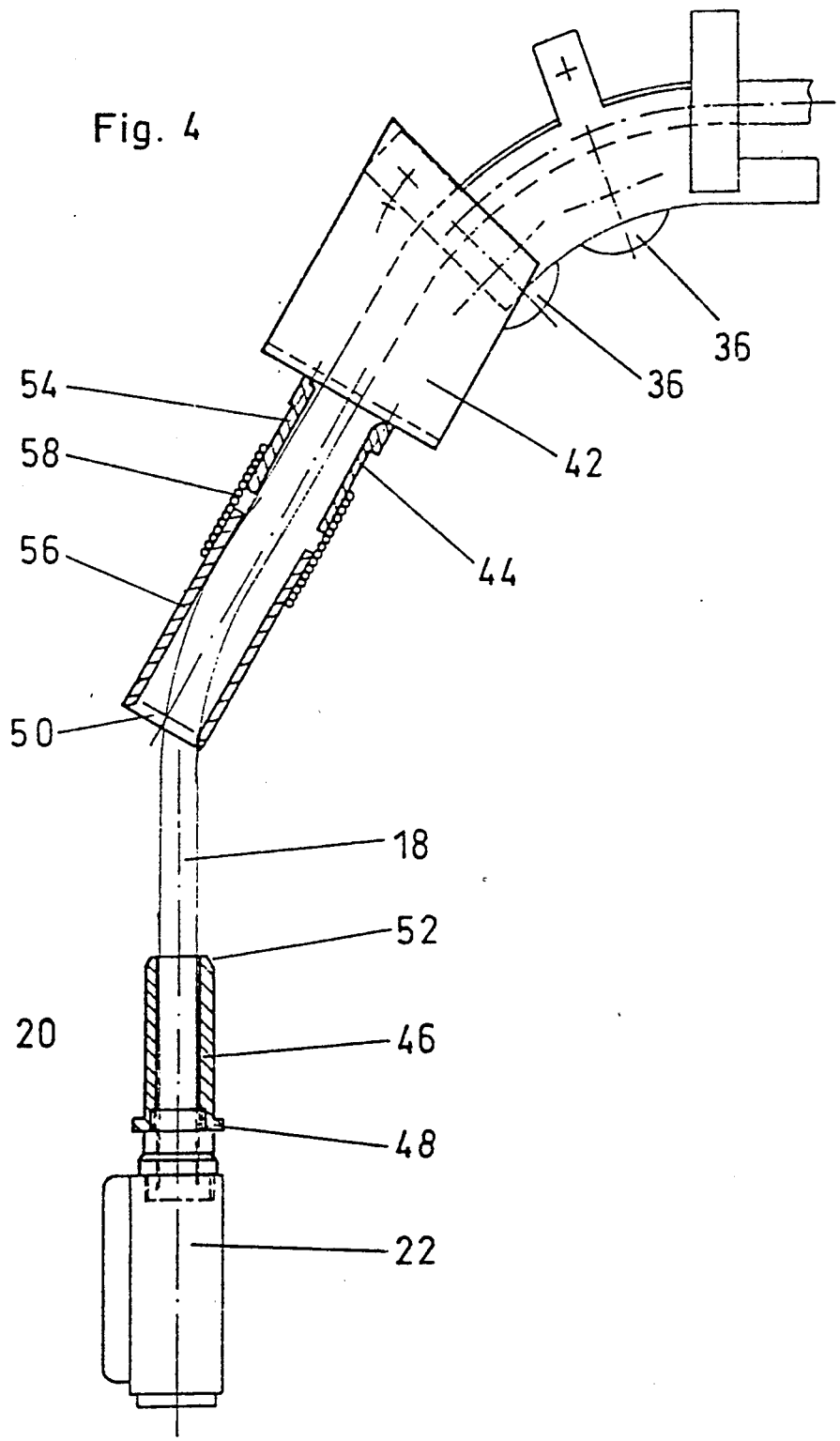

United States Patent [19]

Fladung

[11] Patent Number: 5,145,040
[45] Date of Patent: Sep. 8, 1992

[54] CABLE WINDING DEVICE

[75] Inventor: Manfred Fladung, Mömbris, Fed. Rep. of Germany

[73] Assignee: Manfred Fladung GmbH, Fed. Rep. of Germany

[21] Appl. No.: 606,115

[22] Filed: Oct. 31, 1990

[30] Foreign Application Priority Data

Nov. 8, 1989 [DE] Fed. Rep. of Germany ... 8913225[U]
Dec. 11, 1989 [DE] Fed. Rep. of Germany ....... 8914558

[51] Int. Cl.$^5$ ............................................ H02G 11/02
[52] U.S. Cl. ............................. 191/12.2 R; 191/12 R
[58] Field of Search ........... 191/12 R, 12.2 R, 12.2 A, 191/12.4; 242/54 R, 107

[56] References Cited

U.S. PATENT DOCUMENTS

| 2,013,733 | 9/1935 | Murphy | 191/12.4 |
| 2,543,176 | 2/1951 | Komassa | 191/12.2 R |
| 3,840,713 | 10/1974 | Carpentier | 191/12.2 R |
| 4,138,177 | 2/1979 | Van Valer | 191/12.4 X |
| 4,511,100 | 4/1985 | Oetringhaus | 191/12.2 A X |
| 4,653,833 | 3/1987 | Czubernat et al. | 191/12.4 X |
| 4,825,986 | 5/1989 | Pepper | 191/12.4 |
| 4,842,108 | 6/1989 | Anderson et al. | 191/12.4 X |
| 4,923,135 | 5/1990 | Schabmuller | 191/12.2 A X |
| 5,034,571 | 7/1991 | Galloway | 191/12.2 A |

FOREIGN PATENT DOCUMENTS 118025 6/1986 European Pat. Off. .
252914 6/1989 European Pat. Off. .

Primary Examiner—Robert J. Spar
Assistant Examiner—Scott L. Lowe
Attorney, Agent, or Firm—Jordan B. Bierman

[57] ABSTRACT

A cable winding device (16) for stowage of a supply cable (18) connecting for example a central aircraft supply system of an airport to a supply plug connection of an aircraft is proposed. The cable is unwound from or wound onto the cable winding device, which is preferably of the drum type, via a peripheral opening (40). The free end of the supply cable has a plug unit (22), preferably with control functions. To protect the cable, a guide element enclosing at least sections of the supply cable extends from the cable winding device, to which guide element is allocated a centering element extending from the plug unit and surrounding at least in sections the section (20) of the supply cable extending from the plug unit.

14 Claims, 3 Drawing Sheets

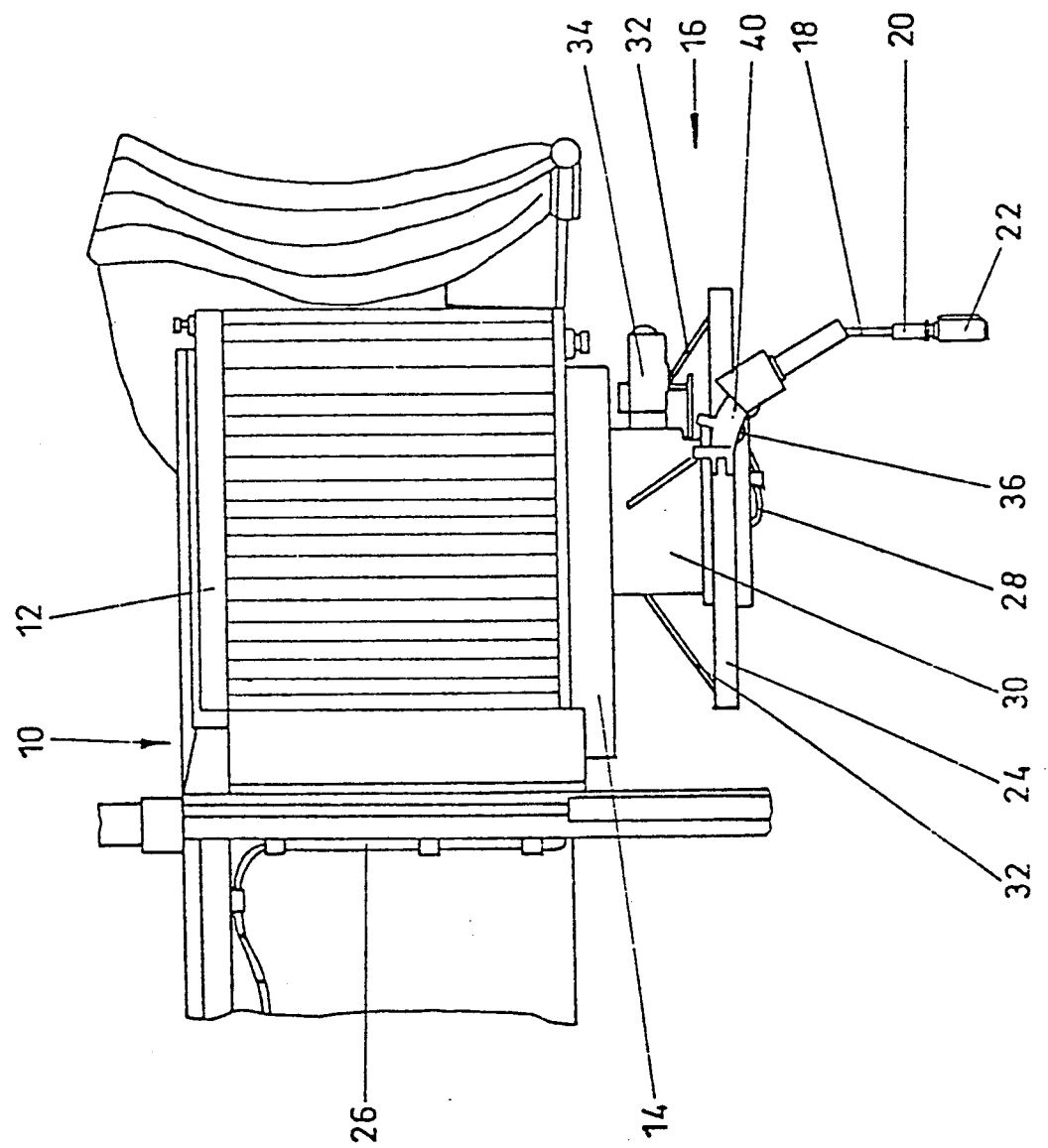

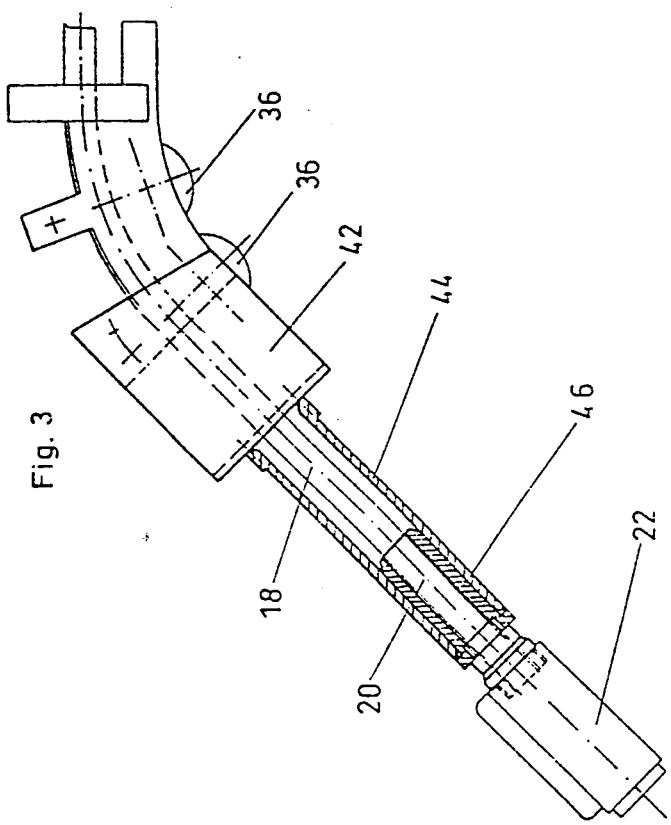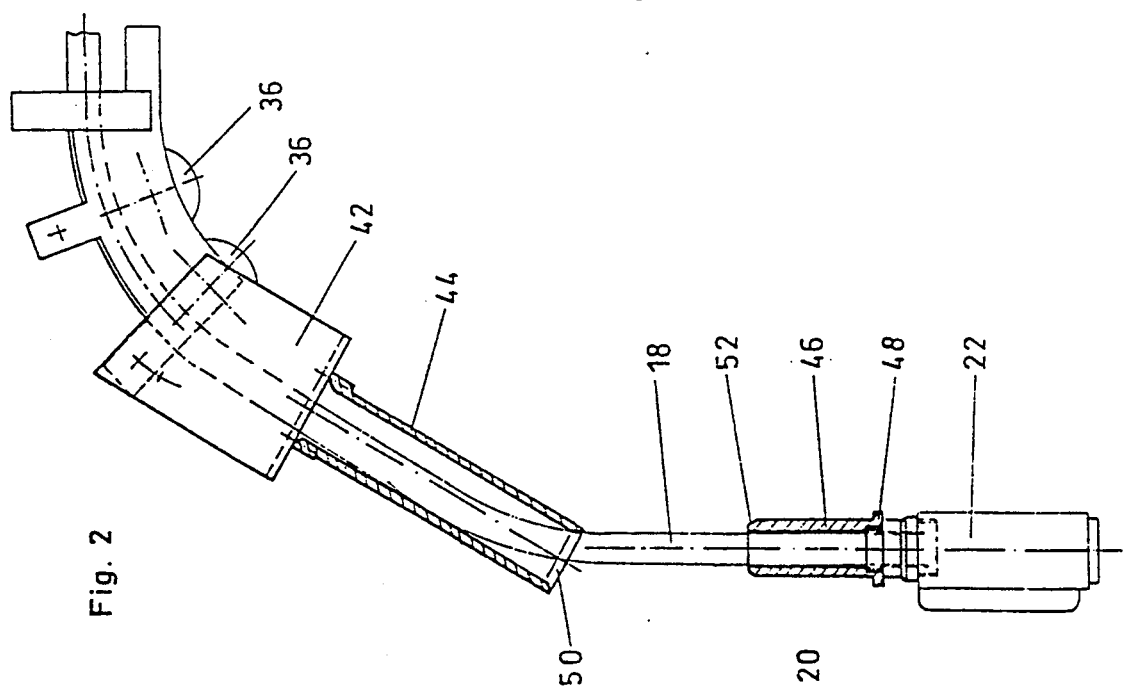

CABLE WINDING DEVICE

The invention relates to a cable winding device for stowage of a supply cable connecting for example a central aircraft supply system of an airport to a supply plug connection of an aircraft, this supply cable being windable through a peripheral opening of the preferably drum-type cable winding device off or onto the device, where the free end of the supply cable has a plug unit preferably with control function (panel).

A corresponding cable winding device is known from DE-U-83 03 469 or from EP-A-0 163 025, for example. The corresponding cable winding devices can here be suspended with a vertical axis under the bridgehead of a gate or a telescopic-type airbridge and set by a motor to the required direction for winding or unwinding.

The cable winding device of the type mentioned at the start has a winding drum and an equalizing drum arranged coaxial thereto and located above the winding drum. A construction of this type is expensive and has the major drawback that only half of the cable in the cable winding device can be used, i.e. unwound. For this reason, a device of this type has proved unsatisfactory in actual practice.

The cable winding device in EP-A-0 163 025 has completely eliminated these drawbacks. To do so, strands are arranged exposed in a section extending in the axial direction of the suspension device or drum and can, during unwinding of the supply cable from the winding drum, be more heavily spirally twisted with a decrease in the radial bulge and during winding less heavily twisted with an increase in the radial bulge. As a result, equalizing sections and their arrangement in the equalizing drum are no longer necessary. The cable winding device known from EP-A-0 163 025, which is arrangeable not only underneath a gate, but also underfloor, has therefore met with unreserved approval and has thus achieved widespread use.

In spite of the major benefits obtainable with cable winding devices of the type mentioned at the outset, the drawback does appear in some cases that the cable end provided with the plug unit breaks free from the cable winding device in the exit area, since this end hangs down free.

The object of the present invention is therefore to develop a cable winding device of the type mentioned above which ensures that the supply cable and its strands are not damaged, and in particular cannot break, in the area of the plug unit such as the panel.

The object is substantially achieved in accordance with the invention in that a guide element enclosing at least sections of the supply cable extends from the cable winding device or is part of the cable winding device, to which is allocated a centering element surrounding at least in sections a section of the supply cable extending from the plug unit.

With the design in accordance with the invention, the section extending from the plug unit is taken up guided by the guide element preferably designed as a tubular element when the supply cable is rolled up, so that uncontrolled forces generated according to the prior art by free suspension are ruled out. The plug unit with the adjoining supply cable accordingly forms a rigid unit which is taken up guided by the guide element. This element can itself be of tubular design, obviously with an external diameter greater than that of the centering element.

In order to ensure when winding up the cable that the centering element can be fitted without difficulty into the guide element to thereby rule out uncontrolled knocks or similar in the transitional area from the supply cable to the centering element, the guide element can extend from a holding device surrounding the opening of the cable winding device and adjustable in relation thereto. This holding device can be designed as a housing and be connected, for example by slots, to the cable winding device. This ensures adjustability, so that consequently the angle under which the cable is inserted into the cable winding device can be adjusted.

In a noteworthy embodiment which is per se inventive, it is provided that the guide element is designed in at least two parts, said parts being connected by an elastic element such as a tension spring. This has the advantage that the front section can align even further onto the draw-in direction of the cable, with presetting possible using the holding device holding the guide element. An equally acting element can also be used instead of a tension spring.

It is further provided that the centering element has on its plug side a flange with which the free outer edge of the guide element is in contact when the centering element is arranged in the guide element.

In order to facilitate introduction of the centering element into the guide element, the internal geometry at least of the free outer edge of the guide element can be flared out and if necessary the free outer end of the centering element tapered inwards.

Both the guide element and the centering element flange-mounted to the plug unit can consist of impact-proof plastic or another suitable material, thereby ruling out damage from blows, impacts or similar events to a large extent.

Further details, advantages and features of the invention are shown not only in the claims and features to be taken therefrom alone and/or in combination, but also in the following description of a preferred embodiment shown in the drawing.

In the drawings,

FIG. 1 shows a side view of the head of a telescopic airbridge with a cable winding device, FIG. 2 is a detailed view of a cable winding device with partially unrolled supply cable, FIG. 3 is the detailed view as in FIG. 2, but with rolled up supply cable, FIG. 4 is a view corresponding to FIG. 3 with a different guide element embodiment.

A telescopic airbridge (10), only the front part of which is shown in FIG. 1, comprises a head (12) on the underside (14) of which is fixed a cable winding device (16) for stowage of a supply cable (18) of a central aircraft supply system. The cable winding device (16) is here moved horizontally and vertically together with the airbridge (10) and fixed in the required position.

The supply cable (18), of which an unrolled section has been numbered (20) and to the outer end of which is arranged a plug unit (22) such as a plug connector, shown purely in principle in the drawing, is held by the cable winding reel (14) designed as a drum (24), where the length of the section (20) depends on the distance between the head (12) and the aircraft to be supplied. The supply cable is connected by a connection box, not shown, to a supply cable piece (26) extending along the telescopic airbridge (10).

The design of the cable winding device (16) can correspond to that of European Patent Application EP-A-

0163025. This means that the cable has a section (28) deflected in the rotary axis of the drum (24) which in its turn merges into a section, inside the housing (30), of exposed, spirally arranged strands which are more heavily spirally twistable while unwinding the supply cable (18) with a decrease of radial expansion and less heavily spirally twistable while winding the cable with an increase in the radial expansion.

A different twist-free connection method between the supply cable (18) and the piece (26), for example using slip rings or similar devices, is of course possible.

The drum (24) holding the supply cable (18) is connected to the housing (30) or the underside (14) of the head (12) by struts (32). Using a gear motor (34), the cable winding device (16) rotates in clockwise or counterclockwise direction depending on whether the supply cable (18) is to be wound onto or unwound from the drum (24).

To ensure a gentle insertion of the supply cable (18), i.e. of section (20), into the drum (24) via the opening (40), support rollers (36) are provided. Finally, rollers can be arranged peripherally on the circumference of the drum (24) to reduce the friction, as shown in the example in PCT/EP 86/00142.

When the supply cable (18) is rolled up, the plug connector (22) hangs free in the known cable winding devices, i.e. can swing uncontrolled, with the risk that the strands of the supply cable break, thereby necessitating replacement of the supply cable or at least the shortening of its life.

The area of the exit opening (40) of the cable winding device (16), i.e. where the guide rollers (36) for supporting the supply cable (18) operate, is now provided with a holding device (42) for a tube element (44) through which the supply cable (18) can be pulled out of or inserted into the cable winding device (16).

The tube (44), also designated as guide element, is allocated a centering element (46), likewise of tubular design, extending from the plug unit (22) which can be designed as a panel. This centering element (46) clearly encloses the supply cable (18) inserted into the plug unit (22), i.e. the section (20). The diameter of the centering element (46) is less than the internal diameter of the guide element (44), in order to thereby permit insertion—as made clear in FIG. 3—of the centering element (46) up to a stop (48) into the guide element (44) with the supply cable (18) rolled up. As a result, a rigid unit comprising plug unit (22), centering element (46), guide element (44), holding device (42) and drum (24) is formed, as a result of which the cable (18) passing inside this rigid unit is no longer subjected to uncontrolled forces.

In particular, when the supply cable (18) is not used, i.e. when it is mainly rolled up on the cable winding device (16), it no longer hangs freely, so that consequently the strands of the supply cable (18) too are protected.

The drawings also clearly illustrate that the holding device (42) is adjustable in relation to the cable winding device (16) in order to thereby allow setting of the insertion angle of the centering element (46) into the guide element (44). This ensures that at the transition from the supply cable (18) to the centering element (46), there are no shock forces acting on the supply cable (18) in the area of the free end of the centering element (46).

Insertion of the centering element (46) into the guide element (44) is facilitated further by the fact that the inner wall at least of the opening (50) of the guide element (44) flares out. In addition, the front free end (52) of the centering element (46) can be chamfered.

Both the centering element (46) and the guide element (44) can be detachably mounted to the plug unit (22) or holding device (42) using screw connections. The holding device (42), that can be designed as a tubular or as a block-shaped housing, is connected to the cable winding device (16) using a flat iron section extending from the device, the connection itself being made using slots to allow adjustment of the inclination angle of the holding device (42).

FIG. 4 is a particularly noteworthy embodiment of the guide element (44).

The guide element is therefore divided into two sections, an inner (54) and an outer (56), which are at a distance from one another and are connected by a flexible element such as a tension spring (58) or similar element. The advantage obtained here is that the outer section (56) swivels in relation to the inner section (54), thereby allowing the cable insertion angle to be adjusted for gentle insertion of the cable (18).

I claim:

1. A cable winding device for stowage of an electrical supply cable provided to connect a central aircraft supply system of an airport to a supply plug connection of an aircraft, said supply cable being windable through a peripheral opening of a drum-type cable winding reel, said device comprising;

a tubular guide element through which a length of said supply cable may slide, said guide element enclosing cross-sections of said supply cable as said supply cable is slid through said guide element, said guide element extending from a holding device surrounding said opening of said cable winding device, said holding device being adjustable in relation to said cable winding device, a centering element extending from a plug unit connected to a free end of said supply cable, said centering element surrounding a cross-section of said supply cable adjacent said plug unit, said centering element being insertable into said guide element when said supply cable is wound upon said device, and wherein, said guide element is divided into a tubular inner section and a tubular outer section, which each enclose a separate portion of the length enclosed within said guide element, and are flexibly connected to one another by a flexible tubular connecting means which is less rigid than said inner and said outer sections.

2. A cable winding device according to claim 1, wherein said plug unit is provided with a panel for control functions.

3. The winding device according to claim 1 wherein said centering element has a flange (48) on its plug side with which a free outer edge of said guide is in contact when said centering element is in said guide.

4. The cable winding device according to claim 1 wherein an outer opening of said guide element is flared out at least on its inside.

5. The cable winding device according to claim 1 wherein an inner end of said centering element is tapered.

6. The cable winding device according to claim 1 wherein said connecting member is a spring element.

7. The cable winding device of claim 6 wherein said spring element is a tension spring.

8. A cable winding device for stowage of an electrical supply cable connecting a central supply system to a complementary supply plug connection remote from said central system, said supply cable being windable through a peripheral opening in said cable winding device off of or onto a reel, a free end of said supply cable having a plug adapted for insertion into said connection, a tubular guide element through which a length of said supply cable may slide, said guide element enclosing cross-sections of said supply cable as said supply cable is slid through said guide element, said guide element extending from said winding device, a centering element surrounding a cross-section of said supply cable and extending from said plug, said centering element being complementary to and adapted to fit within said guide element when said supply cable is wound upon said device, said guide element being divided into a tubular inner section and a tubular outer section, which each enclose a separate portion of the length enclosed within said guide element, and are flexibly connected to one another by a flexible tubular connecting means which is less rigid than said inner and said outer sections.

9. The device of claim 8 wherein said flexible connecting means is a tension spring.

10. The device of claim 8 wherein said supply system is of an airport and said connection is located on an airplane.

11. The winding device according to claim 8 wherein said guide element extends from a holding device surrounding said opening and is adjustable in relation to said winding device.

12. The winding device according to claim 8 wherein said centering element has a flange (48) on its plug side with which a free outer edge of said guide is in contact when said centering element is in said guide.

13. The cable winding device according to claim 8 wherein an outer opening of said guide element is flared out at least on its inside.

14. The cable winding device according to claim 8 wherein an inner end of said centering element is tapered.

* * * * *